United States Patent [19]

Elischer et al.

[11] Patent Number: 5,040,226

[45] Date of Patent: Aug. 13, 1991

[54] COURTESY AMOUNT READ AND TRANSACTION BALANCING SYSTEM

[75] Inventors: Victor P. Elischer, Richmond; Ilan Keret, Albany; Milton Johnson, Oakland; Ihsan Tumenbatur, Milpitas; David B. Aragon, Berkeley, all of Calif.

[73] Assignee: TRW Financial Systems, Inc., Berkeley, Calif.

[21] Appl. No.: 200,143

[22] Filed: May 31, 1988

[51] Int. Cl.⁵ .............................................. G06K 9/00
[52] U.S. Cl. ......................................... 382/7; 382/18; 382/61
[58] Field of Search .................... 382/7, 57, 61, 18, 9; 235/454

[56] References Cited

U.S. PATENT DOCUMENTS

| | | | |
|---|---|---|---|
| 4,205,780 | 6/1980 | Burns et al. | 235/454 |
| 4,264,808 | 4/1981 | Owens et al. | 382/7 |
| 4,523,330 | 6/1985 | Cain | 382/7 |
| 4,680,803 | 7/1987 | Dilella | 382/9 |
| 4,736,441 | 4/1988 | Hirose et al. | 382/9 |
| 4,742,551 | 5/1988 | Deering | 382/18 |
| 4,813,077 | 3/1989 | Woods et al. | 382/7 |

FOREIGN PATENT DOCUMENTS 0146351  6/1985  European Pat. Off. .

OTHER PUBLICATIONS

R. M. Brown, "Handprinted Symbol Recognition Systems: A Very High Performance Approach to Pattern Analysis of Free-Form Symbols", Naval Ocean Research and Development Activity, NSTL Station, Mississippi, 39529.

B. Duerr, et al., "A Combination of Statistical and Syntactical Pattern Recognition Applied to Classification of Unconstrained Handwritten Numerals", Pattern Recognition, vol., pp. 189-199, Pergamos Press Ltd., 1980, Printed in Great Britain.

Leon D. Harmon, "Automatic Recognition of Print and Script", Proceedings of the IEEE, vol. 60, No. 10, Oct. 1972.

M. Lybonon, et al., "Recognition of Handprinted Characters for Automated Cartography", SPIE, vol. 155, Image Understanding Systems & Industrial Applications (1978).

P. G. A. Jespers, et al., "A Two-Chip Imaging System for OCR Applications", IEEE Journal of Solid State Circuits, vol. SC-16, No. 3, Jun. 1981.

K. Yamamoto, et al., "Recognition of Handprinted Characters by an Outermost Point Method", Pattern Recognition, vol. 12, pp. 229-236, Pergamon Press Ltd., 1980, Printed in Great Britain.

Primary Examiner—David K. Moore
Assistant Examiner—Yon Jung
Attorney, Agent, or Firm—Townsend & Townsend

[57] ABSTRACT

A method and an apparatus for processing the predetermined numeric fields containing the handwritten numeric entries. The numeric fields are subjected to character recognition analysis, and a confidence level is associated with each such numeric field reflecting the degree of confidence with which the apparatus has recognized the numeric dollar amounts. The transaction is automatically balanced from the data in the system by computing a combined value of the recognized dollar amounts making up a transaction and comparing the combined value with the transaction total. This computation and comparison is performed automatically, without the prior intervention or assistance of a human operator to review, verify, correct or otherwise modify the dollar amounts recognized by the system.

8 Claims, 2 Drawing Sheets

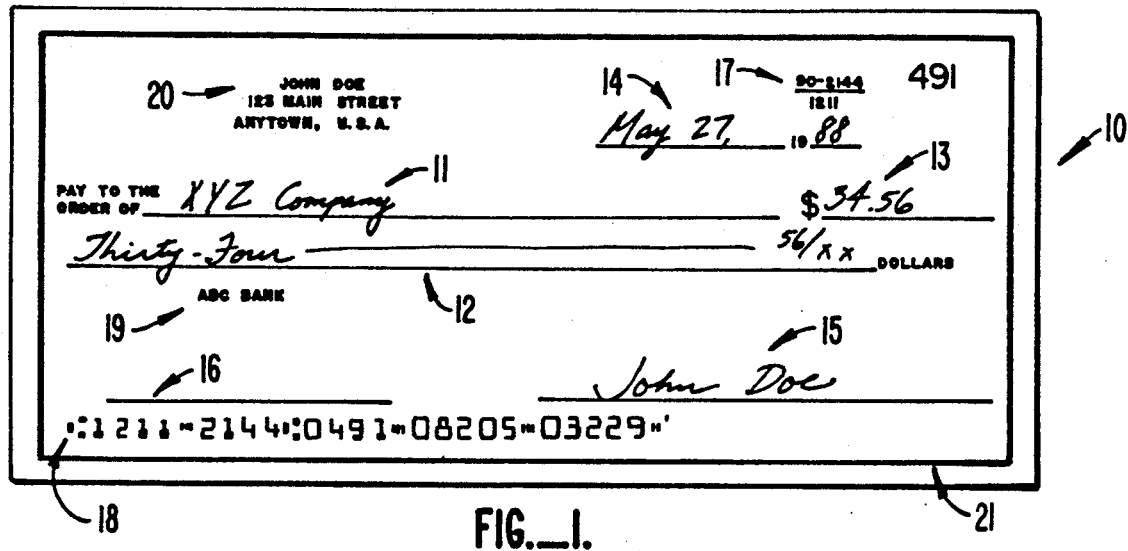
FIG._1.
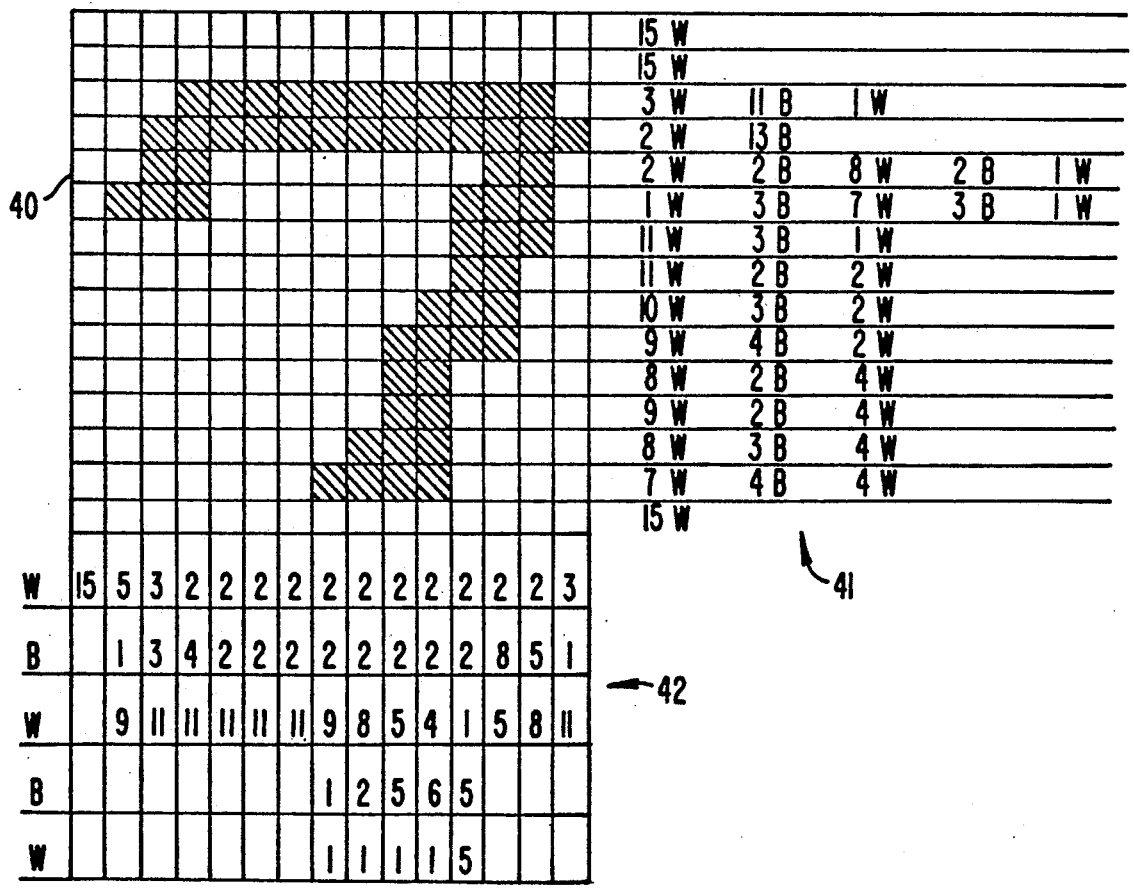
FIG._3.

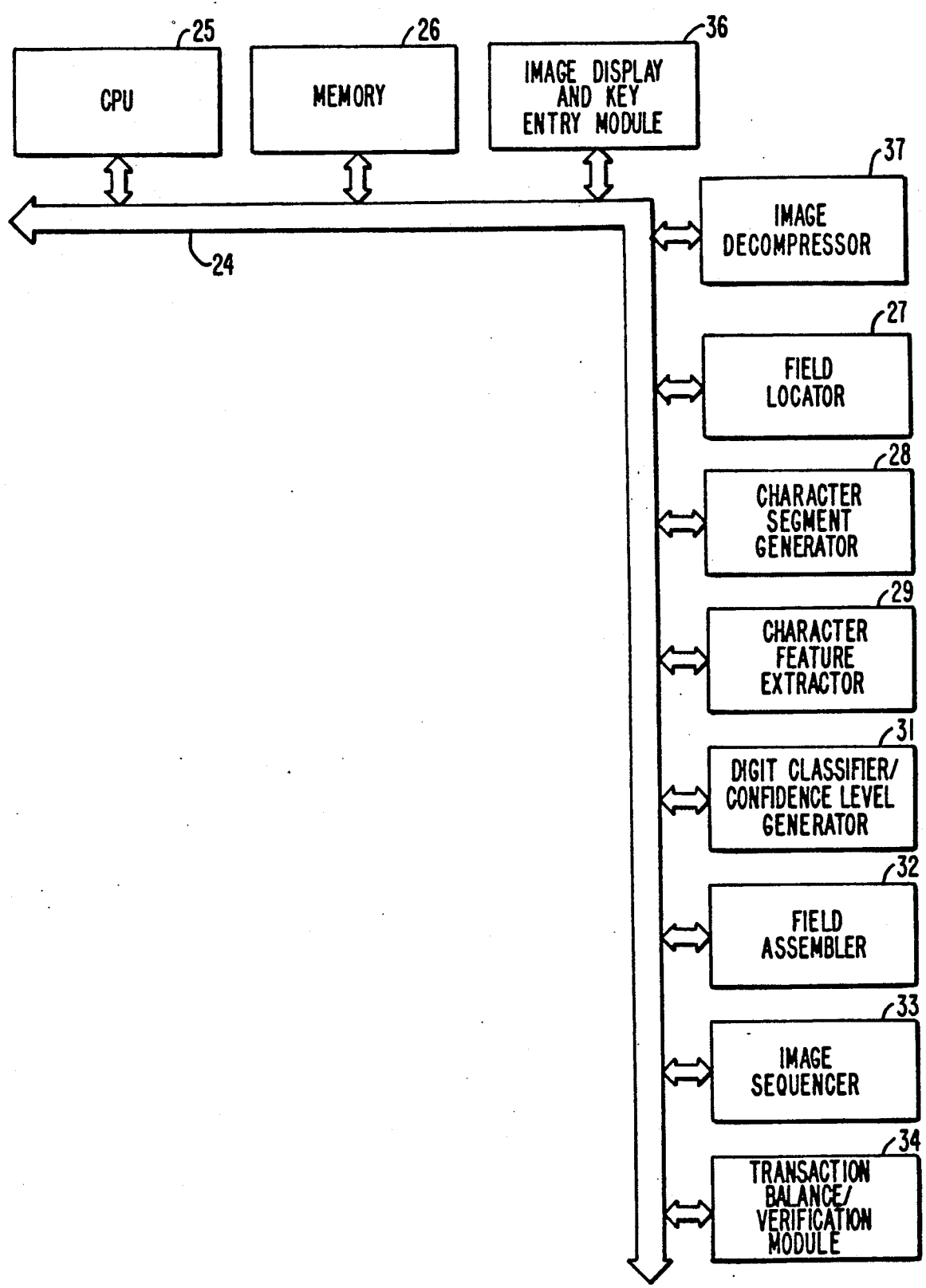
FIG._2.

COURTESY AMOUNT READ AND TRANSACTION BALANCING SYSTEM

BACKGROUND OF THE INVENTION

The present invention relates to apparatus for processing documents arising in financial transactions which include numerical figures, such as bank checks, credit card drafts, and the like. More specifically, the invention relates to apparatus for automatically locating and reading handwritten numeric entries on the documents and balancing and/or reconciling the underlying transaction.

The standard format for bank checks includes a first location in which the dollar amount of the check is spelled out in alphabetic characters and a second location in which the dollar amount is entered in numerical figures. The numeric dollar amount is known as the courtesy amount, and the location on the check in which this amount is written is known as the courtesy amount field. By comparison, the alphabetic amount entry is known as the legal amount.

To assist the bank in processing deposits, at the time of making a deposit the depositor fills out a slip, on which are entered the total deposit amount and dollar amounts of the cash and individual checks making up the deposit. For an individual account, the deposit will generally include only a relatively few checks. For a merchant account, the deposit may include the merchant's receipts for a full day or longer period. In either event, the deposit is accompanied by a deposit slip (sometimes referred to as a deposit ticket or merchant draft for commercial accounts), on which the total deposit amount is indicated.

When the bank later processes the deposit, the dollar amounts of the individual checks and cash making up the deposit are entered into a computer data base along with other relevant data from the check or deposit slip. As a verification that the dollar amounts have been correctly entered, the deposit is subjected to a balancing operation, in which, among other things, the sum of the individual checks is compared with the total on the deposit slip (less any cash deposit). If the total deposit as computed from the individual check amounts entered into the data base does not agree with the total entered from the deposit slip, then the batch is subjected to a separate reconciliation operation to find the error. This operation frequently involves visual inspection of each individual check until the error is found. A large bank may process as many as several hundred thousand checks per day. Given the large volume of checks to be processed, the dollar-amount entry, balancing, and reconciliation procedures are labor-intensive, slow, and costly.

Various automatic apparatus has been developed to reduce the labor and increase the speed with which checks can be processed. Much of the data appearing on checks and deposit slips, for example, is printed in machine-readable form. The payor bank and payor account number normally will be printed on the individual checks in a type font suitable for optical character recognition (OCR) or with magnetic ink for magnetic ink character recognition (MICR). The depositor's account number will similarly appear on the deposit slip in OCR and/or MICR characters.

The use of OCR and MICR encoded characters greatly facilitates processing because these characters may rapidly and automatically be scanned, recognized, and entered into the data base with high reliability. Handwritten dollar amounts on checks and deposit slips, however, are not so amenable to these techniques due to the unconstrained nature of handwritten characters and the great variety of handwriting styles.

The problem of automatically reading handwritten alphanumeric characters has been addressed by a number of authors. See, for example, "Automatic Recognition of Print and Script," by L. D. Harmon, *Proceedings of the IEEE*, (October 1972), which provides a general review, and the following publications, which discuss specific approaches: "Recognition of Handprinted Characters for Automated Cartography," by M. Lybanon and L. K. Gronmeyer, *SPIE*, Vol. 155, p. 56, *Image Understanding Systems & Industrial Applications* (1979); "Recognition of Handprinted Characters by an Outermost Point Method," by K. Yamamoto and S. Mori, *Pattern Recognition*, Vol. 12, p. 189 (Pergamon Press Ltd., 1980); "A Combination of Statistical and Syntactical Pattern Recognition Applied to Classification of Unconstrained Handwritten Numerals," by B. Duerr, W. Haettich, H. Tropf and G. Winkler, *Pattern Recognition*, Vol. 12, p. 189 (Pergamon Press Ltd., 1980).

Despite the efforts to develop improved methods for reading handwritten characters, known automatic recognition techniques are still prone to errors. Recognition errors may be of two types. One type, referred to as confusion error, occurs when a character cannot be recognized at all. The other type, referred to as substitution error, occurs when a character is misread and identified as the wrong character. Confusion errors are easily signaled by the recognition apparatus and may be corrected by a human operator, who keys the correct amount by hand from the check or deposit slip itself. Substitution errors, on the other hand, are more difficult to detect and threaten the integrity of the financial transaction data records. The cost in time and labor to find and correct a substitution error may far outweigh the value of the underlying transaction. Automatic recognition of handwritten dollar amounts on checks and other bank documents has generally not been embraced by the banking industry because it has not been found to reduce the labor involved in processing checks and, in fact, it may even increase labor requirements because of the extra effort needed for handling the error stream generated.

A system greatly reducing the amount of labor needed to process financial documents such as checks is disclosed in U.S. Pat. No. 4,205,780. In that system, the checks or other documents are processed almost entirely electronically. The images of all the checks in a batch along with the deposit slip (and typically along with numerous other batches) are captured electronically from a rapidly moving transport and stored for subsequent processing. After capture and storage, the documents and transactions are processed electronically with minimal need to handle the paper checks or other documents. In this system, it is still necessary for human operators for to read and key the dollar amounts from the individual checks and deposit slips. Here, however, the operators read the dollar amount from the image displayed at a video terminal. Verification that the correct dollar amounts have been entered may be performed, in the first instance, by having two separate key operators enter the dollar amount for each check. If the two entries do not agree, then the system calls for a correction. The system then proceeds to balancing by comparing the total of the individual checks with the total amount keyed from the deposit slip. Any discrepancy here goes to a reconciliation procedure, which is again performed from the video terminals. This system greatly speeds up the processing of checks, among other reasons, because the dollar amounts may be keyed from the images displayed at the video terminals much faster than from the paper checks themselves, and any discrepancies may quickly be discovered and corrected at the video terminals. Furthermore, the system greatly reduces the labor demand because it is not necessary to physically handle each check and physically carry the batches of checks from station to station.

Machine recognition of handwritten dollar amounts has proved difficult primarily for two reasons. First, the precise position on the check where the courtesy amount is written is not standard, but exhibits a range of variation depending on the style of the check. Second, the great variation in handwriting styles multiplies the complexity of the recognition problem, with the result that known attempts at automatically reading the courtesy amount have not been able to do so sufficiently reliably to be acceptable in banking and other financial institutions.

SUMMARY OF THE INVENTION

The present invention provides an improvement in the processing of documents arising from financial transactions which record dollar amounts in handwritten numeric figures. The invention enables the dollar amounts to be machine-read and the transactions balanced in such a manner as to quickly find and correct any unreadable or misread dollar amounts.

The invention is used for processing documents, such as bank checks, credit card transaction slips and deposit slips, which have a plurality of predetermined fields generally containing alphanumeric entries. Included amongst the predetermined fields is at least one numeric field containing a handwritten numeric entry. The fields are generally ordered on the document in a prescribed sequence, although the precise positions of the fields may not be known and may not even be uniform from document to document. At least one document will provide a transaction total, which may also be given in handwritten numeric figures in a predetermined field. The invention is practiced in conjunction with a document processing system which captures the image of such documents and represents them in the system by pixel arrays.

Briefly, according to the invention the predetermined numeric fields containing the handwritten numerical entries are automatically located in the pixel array, the numeric fields are subjected to character recognition analysis, and a confidence level is associated with each such numeric field reflecting the degree of confidence with which the apparatus has recognized the numeric dollar amounts. The transaction is automatically balanced from the data in the system by computing a combined value of the recognized dollar amounts making up a transaction and comparing the combined value with the transaction total. This computation and comparison is performed automatically, without the prior intervention or assistance of a human operator to review, verify, correct or otherwise modify the dollar amounts recognized by the system.

As many handwritten dollar amounts are difficult to recognize and no presently known method of machine recognition provides 100 percent accuracy, the first combined value will not always agree with the transaction total. In that event, the images of the documents are presented to a key operator one by one on a display terminal for key entry of the dollar amounts. The image of the document containing the numeric field with lowest confidence level is presented first. When the key operator enters the dollar amount from the image, the combined value is automatically re-computed and compared with the transaction total. If a match is found, then the processing continues with the next transaction.

It is an advantage of the present invention that it significantly reduces the reliance on human key operators to process financial documents with handwritten numeric dollar amounts. Where the intervention of a key operator is necessary, the invention significantly reduces the number of key strokes performed by the key operator while maintaining the high level of reliability demanded by financial institutions.

In one aspect of the invention, the field containing the numerical entry is located by performing a histogram analysis of the pixels in the array representing the document in a direction which is generally perpendicular to the principal boundaries or gaps separating the various predetermined fields on the document. The histogram analysis determines the local regions in which black pixels are accumulated on the document and, hence, determines the positions in the array of the fields. The numerical-entry field is selected from the located fields according to prescribed criteria. For example, if bank checks are being processed, then the courtesy amount field will be selected according to a predetermined position in the sequence of the fields found by the histogram analysis. Confirmation that the numeric field is found may be made by searching for a dollar sign, for those fields known in advance to include dollar signs.

Other aspects, advantages and features of the invention are described hereinbelow or will be readily apparent to those skilled in the art from the following specifications and drawings.

BRIEF DESCRIPTION OF THE DRAWINGS

FIG. 1 is an illustration of a bank check showing a typical disposition of the handwritten courtesy amount.

FIG. 2 is a block diagram of apparatus for practicing the invention.

FIG. 3 is a pixel array of a numeric character to be subjected to automatic character recognition.

DETAILED DESCRIPTION OF A SPECIFIC EMBODIMENT

For purposes of illustration, the invention is described in a particular embodiment applied to the processing of checks. Those skilled in the art will readily be able to apply the methods described herein to other types of financial documents as well, such as bank giros or credit card transaction slips.

FIG. 1 illustrates a typical check 10, including a plurality of predetermined fields 11–20. These include the payee field 11, the legal amount field 12 (in which the dollar amount of the check is written out in alphabetical characters), the courtesy amount field 13 (in which the dollar amount of the check is written out in numeric figures) the date field 14 the signature field 15, and a field 16 for a memo of the transaction. These fields are generally filled in at the time of the particular transaction to which the check relates. In addition, the check 10 includes a number of other preprinted entries. The numerical entry in the field 17 indicates the particular bank, the branch, and the federal reserve district. The field 18 includes OCR and MICR characters encoding the bank, branch, payor account number, and sometimes other data. In addition, the check may also include the preprinted name and address of the issuing bank at field 19 and the preprinted name and address of the account holder at field 20. The check may also include a decorative border, such as indicated at reference numeral 21, which, though not encoding any information, nevertheless may be confused with information-bearing fields by automatic recognition apparatus.

Preliminary to processing the checks and accompanying deposit slips according to the invention, the image of each document is captured electronically and represented by a pixel array, which is stored in memory for subsequent processing. In the document processing system of U.S. Pat. No. 4,205,780, for example, the images of the document are captured at a fast rate off of a moving transport by a scanning device, which scans the individual checks in the vertical direction. Scanning apparatus for capturing the image and forming the pixel array representation is well known and will not be described further herein.

FIG. 2 shows a functional-level block diagram of apparatus for practicing the invention. The functional blocks communicate over bus 24 and are under the control of CPU 25. The system includes memory 26 for storing the document images, field-locating unit 27 for locating the courtesy-amount field on the document being processed, character segment generator 28 for partitioning the located courtesy-amount field into segments, each containing an individual character, and a character-feature extractor 29 for extracting prescribed features from the character segments. Also shown in FIG. 2 are a digit classifier and confidence level generator 31 for assigning numeric digit identifications to the character segments and for determining the confidence levels with which the individual numeric digits are recognized; a field assembler 32, which assembles the recognized digits into an overall courtesy amount and assigns an overall field confidence level to the courtesy amount; an image sequencer 33 for presenting the document images according to reverse confidence level order; and a transaction balancing and verification module 34 used in the balancing and reconciliation operations. Display and key entry module 36 is used by a key operator to view displayed images and/or keyed data for reconciliation of unbalanced transactions. The module 36 may be provided by a conventional display terminal and keyboard.

Document images may be stored and retrieved from memory 26 for presentation to the subsequent processing apparatus according to methods which are well known in the art. If the images are stored in compressed form, then they may be decompressed by suitable decompression techniques by decompressor 37 before presentation for processing.

The field locator 27 receives a pixel array extracted from memory 27 and subjects the array to a histogram analysis of black and white pixels to locate the predetermined fields running across the document. According to this analysis, the black pixels in a horizontal line, that is, in the direction of the predetermined fields, are counted and recorded for each line in sequence to generate a histogram from the data. The peaks of the histogram overlie the horizontal fields. For checks, it is known in advance that the courtesy amount field is located in the right half of the check so that in this case the histogram need be constructed only from the pixel data from the right half of the image.

The histogram records the accumulation of black pixels at each line and peaks at the pre-determined fields in which the characters are written. From these peaks, the array coordinate positions of the sequence of predetermined fields, including the courtesy amount field, can be extracted. The courtesy amount field is then selected as that predetermined field at the proper position in the sequence, for example, the third field counting from the bottom.

Some checks will include a decorative border extending around the outer extremities of the document image. The presence of such decorative borders may also be detected from the histogram analysis. A decorative border will produce a comparatively sharp peak in the histogram located close to the edge of the document image. If such a peak is observed at the lower or upper horizontal edges of the check, then it is presumed to be a decorative border, which is not counted in the sequence of predetermined fields.

The field locator may be implemented by software executed by CPU 25. The histogram analysis is then performed by a histogram generator routine, which functions as follows.

The right portion of the pixel array is stored in the memory 26. The checks are typically scanned in the vertical direction from top to bottom and the resulting scan lines are stored sequentially in the memory 26. The pixel array is divided into horizontal and vertical lines, the vertical lines corresponding to the scan lines and the horizontal lines of one pixel from each scan line. For example, the first horizontal line consists of the first pixel from each scan line. To keep track of black pixels as they occur in the array, a counter is provided, which will be reset as described below after each horizontal line is examined.

As a first step, the counter is reset. The pixels are recalled from memory in the order they occur in a horizontal line. Each pixel is examined, and if black, the counter is incremented. This process is repeated until all pixels are recalled from memory corresponding to an individual horizontal line. At that point the counter will give the number of black pixels occurring in the corresponding horizontal line. That number is stored in memory, the counter is reset, and the next horizontal line is examined. The process is repeated until all horizontal lines have been examined. At this point the memory 26 holds a complete histogram for the right portion of the pixel array.

The next step is to determine the peaks and the valleys of the histogram. First, the horizontal lines are partitioned into groups, for example, consisting of eight lines each. The maximum black pixel count within each group is taken as a representative value of the group. The use of representative values for the groups serves to eliminate insignificant local minima and maxima in the histogram. Next, the values associated with adjacent groups are compared to find the peaks of the histogram. The comparison is performed, in effect, by computing the derivative of the histogram curve to locate the zero of the derivative. The points so determined are either local maxima or local minima of the histogram. Tracking the sign change determines whether any individual such critical point is a maximum or a minimum.

The peaks define the positions of the various fields on the check. The courtesy amount field is taken to be the third peak from the bottom.

In the embodiment of the method just described, the histogram was generated from the full pixel array for the right half of the check. Alternatively, in embodiments in which the image is stored in compressed form, the histogram may be derived directly from the compressed image without the need of decompression.

The predetermined courtesy amount field located by the field locator 27 is then passed on to the character segment generator 28. This unit searches in the horizontal direction within the field for distinct characters. A candidate character segment is identified as a segment of the field containing a substantial connected region of black pixels.

The character segment generator may be implemented by software executed by CPU 25 as described below.

The vertical scan lines of the courtesy amount field are examined in sequence starting from one extremity of the field to detect black pixels, and as black pixels are found, their addresses are stored in memory. When a black pixel is then encountered in the next adjacent scan line, the routine looks for a connectivity to a black pixel in the previous scan line. Individual black pixels are considered to be connected if they border on one another either at an edge or at a vertex. Black pixels which are found to be connected are associated and stored as a group. As the examination continues, the groups are merged together when the examination reveals them to be connected.

This procedure is followed for the entire courtesy amount field. After the courtesy amount field has been examined in this way, a preliminary analysis is made of the connected regions which were found so as to eliminate insignificant groups of pixels. Criteria may readily be specified for determining when a group is insignificant depending upon the width, height and/or aspect ratio or other parameters of size or shape. The specific criteria, of course, depend upon the particular types of documents under examination. For bank checks captured with a resolution of 200 pixels per inch, for example, a group will generally be insignificant, and may be eliminated at this preliminary stage, if the height of the group is less than ten pixels because numeric digits, and even decimal points, written in the size of field found on bank checks will always be greater than ten pixels high.

The groups remaining after this preliminary examination are all candidate numerical characters.

Due to the many styles of handwriting it has generally been found advantageous in the art to perform a character recognition analysis through analysis of the specific features forming the characters. This function is performed by the feature extract generator 29, which may also be implemented in software according to the following scheme.

The segmented connected regions determined by the segment generator 28 are recalled one by one from memory and subjected to feature analysis. As a preliminary step a boundary is drawn around the segmented object under consideration, and all pixels within that boundary are copied into a scratch pad for further analysis. In a specific embodiment of the invention, the boundary may be defined by those bytes from the pixel array in memory 26 which touch the character under examination. All bytes of the boundary and all bytes encompassed by the boundary are copied into the scratch pad.

The character in the scratch pad is then subjected to run-length encoding in both the vertical and horizontal directions. The run-lengths are separately stored in memory for later use in the feature extraction.

The run-lengths associated with the character at issue are used to determine the presence or absence of a specialized set of component features. A representative set of features, which has been especially adapted for recognition of numeric digits 0-9 (and the dollar sign), is exhibited in Table I.

TABLE I

| Feature | Description |
| --- | --- |
| 0 | Horizontal line segment on top of the character. |
| 1 | Horizontal line segment at bottom of the character. |
| 2 | Vertical line segment at right of the character. |
| 3 | Vertical line segment at left of the character. |
| 4 | Vertical line segment at upper-right of the character. |
| 5 | Vertical line segment at lower-right of the character. |
| 6 | Vertical line segment at upper-left of the character. |
| 7 | Vertical line segment at lower-left of the character. |
| 8 | Only ONE white-to-black-to-white transition in hor. direction. |
| 9 | TWO white-to-black-to-white transitions in hor. direction. |
| 10 | More than TWO white-to-black-to-white transitions at upper half in hor. direction. |
| 11 | More than TWO white-to-black-to-white transitions at lower half in hor. direction. |
| 12 | Opening (break) at upper-right of the character. |
| 13 | Opening (break) at lower-right of the character. |
| 14 | Opening (break) at upper-left of the character. |
| 15 | Opening (break) at lower-left of the character. |
| 16 | Only ONE white-to-black-to-white transition in ver. direction. |
| 17 | TWO white-to-black-to-white transitions in ver. direction. |
| 18 | More than TWO white-to-black-to-white transitions at right half in ver. direction. |
| 19 | More than TWO white-to-black-to-white transitions at left half in ver. direction. |
| 20 | Height of the character greater than two times the width. |
| 21 | One-third of the height has more than ONE white-to-black-to-white transitions in hor. direction. |
| 22 | S-type character. |
| 23 | Z-type character. |
| 24 | Downward arc at upper half. |
| 25 | Upward arc at upper half. |
| 26 | Downward arc at lower half. |
| 27 | Upward arc at lower half. |
| 28 | Not used. |
| 29 | Not used. |
| 30 | Not used. |
| 31 | Not used. |

Table I identifies 28 standard features. The presence or absence of these features in a given character segment is recorded in a (32-bit) character identification vector, or feature vector, associated with the segment. Each feature is associated with a prescribed bit of the vector. Methods of defining and manipulating feature vectors are known in the art and will not be described here in detail.

The method of feature extraction may be illustrated with reference to FIG. 3, which shows a pixel array of the numeric character seven, copied into a 15-by-15 pixel scratch pad 40 together with its run-lengths. The horizontal run-lengths are indicated at 41 and the vertical run lengths at 42. To determine the presence of feature number zero, for example, the run-lengths are recalled from memory and examined to locate the first row which includes a black pixel. In the example of FIG. 3, the first black run occurs in the third horizontal row from the top. The length of the black pixel run in the third horizontal row is compared with the width of the character. If that length is greater than or equal to two-thirds of the character width, then feature zero is deemed to be present in this segment. In FIG. 3 the black run-length is eleven pixels wide compared with a character width of fourteen, so that Feature zero—a horizontal line segment disposed at the top of the character—is recorded as being present, and a corresponding bit is set in the feature vector.

In practice, it is advantageous first to examine the terminal character at the left end of the courtesy amount field to determine whether it is a dollar sign. Presence of the dollar sign confirms that the courtesy amount field was properly selected. Thus, the feature vector associated with the left terminal character is generally processed first.

Once the features have been extracted and a feature vector associated with the character, control passes to the digit classifier and confidence level generator 31. The digit classifier uses a dictionary to recognize numeric characters. The dictionary is generated from a training sample of handwritten numeric characters. The larger the sample used to generate the dictionary, the more useful the dictionary will be. To generate the dictionary, each character of the training sample is subjected to the feature extraction analysis described above and a corresponding feature vector is generated. The feature vectors so formed constitute the entries in the dictionary. The numeric digits from which the individual feature vectors are derived are independently entered and associated with their corresponding vectors.

It may of course happen that two confusingly similar numeric characters, for example, a poorly drawn 8 and 3, map onto the same feature vector. This possibility will be reduced by examining a larger training sample of characters in generating the dictionary. Even if the dictionary is occasionally unable to distinguish handwritten characters or identify them with certainty, it may nevertheless be utilized in the present invention to reduce the labor and increase the speed with which the documents are processed.

All the feature vectors generated from the set of training characters and their associated digits (which are independently keyed into memory) are first assigned to a single cell, referred to as cell zero. Cell zero is then partitioned into two cells, which are defined with respect to a first of the features from Table I. For example, the two cells may be defined with respect to feature zero, depending on whether feature zero is or is not present in the feature vector. Each cell will have an error associated with it, which is derived from the component elements of the cell. The error may be calculated, for example, by determining a mean feature vector for the cell. The "distance" between an individual feature vector of the cell and the mean feature vector is determined for each vector of the cell, and all such distances are summed. The sum may be taken as the error for the cell. The error, in turn, is expressed as a confidence level for the cell.

Other methods of defining and calculating cell errors are known in the art and may be utilized here. As described below, in the present invention the error serves to determine the sequence of images to be presented to a key operator, if the transaction does not balance. Thus, the absolute error of a cell is not as significant as the relative error between cells, so that many definitions of error may be used to advantage in the present invention.

An alternative method of calculating the error, which is significantly faster, is as follows. First, the keyed digit (keyed at the time the training sample is analyzed) which occurs most frequently in the cell is determined. The error for that cell is then taken to be the number of vectors in the cell which represent a digit other than the most frequently occurring digit. In this example, a confidence level for the cell may be defined as the fraction of the group which represents to the most frequently occurring digit.

At this stage an intermediate confidence level has been defined which may be used as the confidence level associated with the cell provided that the cell is not to be split any further. The error associated with the cell is used to determine whether further splitting is desired. The tree is further split until the maximum number of cells is generated which can be tolerated depending upon storage capacity and the size of the data set. Assuming the maximum number of cells has not yet been reached, the terminal cells are examined and the one with the largest error is subjected to further splitting in the manner described above. The procedure is repeated until the maximum tolerable number of cells and their associated confidence levels have been generated.

The field assembler 32 defines an overall confidence level for the entire field, which is derived from the confidence levels of the individual characters required in the field. For example, the field confidence level may be taken as the product of the individual character confidence levels. If a segment which cannot be recognized is assigned confidence level zero, then the overall field confidence level will also be zero. With an unrecognizable character in a numeric entry field, the transaction undoubtedly will fail to balance. The image sequencer will then present the images first which have confidence level zero, i.e., the unrecognizable images, for correction by a key operator.

Even if the digit classifier 51 makes an incorrect identification resulting in a substitution, say, a "3" for an "8", a confidence level will be generated for that character, which indicates something less than 100 percent confidence in the identification. With a substitution error the transaction will undoubtedly fail to balance, and the most likely substitution errors, as measured by their confidence levels, will be presented to the key operator first.

The image sequencer 33 determines the order in which the images are presented at the display module 36. The sequence is chosen so as to minimize labor in data entry. The sequencer sorts the image addresses in the order of lowest to highest field confidence level. In presenting the image of checks and deposit tickets, the confidence level of the deposit ticket is weighted by the reciprocal of the number of checks recorded on the deposit ticket. In this manner, any uncertainty in recognition of the total amount from the deposit ticket is given preferential treatment in determining which images to present first to the key operator.

The transition balance and verification module 34 performs a straightforward balancing operation to determine whether the transaction total matches the value computed from the data recognized from the individual checks. If a match is found, then document processing continues in its ordinary course. If no match is found, then the module 34 causes an image to be presented on the display module 36 in the order dictated by the image sequencer 33. Upon key correction by the key operator, the transaction balancing operation is performed again, and the cycle repeats. Software implementing the balancing operation and associated control functions may readily be devised by a programmer of ordinary skill in the art and hence will not be described further.

While the balancing operation according to the present invention has been illustrated with respect to a bank deposit consisting of a number of checks and a deposit slip, the same procedures may also be applied to balancing component entries and total amount appearing on a single document, such as the check entries and deposit total appearing on the deposit slip or itemized and total charges appearing on a credit card draft. In this case, the field locator will be programmed to locate a different arrangement of predetermined fields from that illustrated here.

While the above provides a full and complete disclosure of illustrative and preferred embodiments of the present invention, various modifications, alternate constructions, and equivalents may be employed without departing from the spirit and scope of the invention. For example, while the invention arose and was developed in the context of check processing, and is illustrated here in that context, those skilled in the art will recognize that the invention may be applied in processing other types of financial documents and transactions. In such other types of financial documents the predetermined fields may be arranged in different ways from that illustrated here and may even be arranged side by side. Given the benefit of the present disclosure, the skilled artisan will readily be able to apply the present methods to such alternative arrangements. Therefore, the invention is not to be limited to the specific embodiments disclosed above, but is defined by the appended claims.

What is claimed is:

1. A method of processing documents to record handwritten numerical entries, said documents including a plurality of first document types and a second document type, each said first document type having a predetermined field containing a handwritten numerical entry and said second document type having a predetermined field containing a numerical entry representing the combined value of the numerical entries of said first document types, said method comprising the steps of:
   locating said predetermined fields; segmenting said predetermined fields into segments, each containing an individual character of the numerical entry of the associated predetermined field;
   subjecting each said character segment to character recognition analysis so as to associate a character therewith;
   assigning a character confidence level to each said character representing the accuracy with which the associated character was recognized;
   deriving an overall confidence level for each numerical field from the associated character confidence levels;
   automatically computing the combined value of the recognized numerical entries for said first document type;
   automatically recognizing the numerical entry value of said second document type;
   comparing said computed combined value with the recognized numerical value of said second document type to verify whether said computed combined value and said recognized value match;
   if said computed and recognized values fail to match, displaying the images of the numerical entries in the order of increasing overall confidence levels whereby a key operator may enter numerical entries from the images;
   repeating said comparing step after each numerical entry from the images; and
   terminating said displaying step when a match is found.

2. A method of automatically locating the courtesy amount field on a check being represented by a pixel array and including a plurality of writing fields for signature, legal amount, date, and the like, said courtesy amount field being preceded by a dollar sign, comprising the steps of:
   performing a histogram analysis of the pixels in said array in a direction generally perpendicular to said courtesy amount field so as to locate the writing fields, in sequence, on said check;
   selecting a field from said located writing fields at a predetermined position in said sequence; and
   subjecting said selected field to character recognition analysis to recognize said dollar sign in said selected field, thereby verifying that the said selected field is said courtesy amount field.

3. The method of claim 1, wherein the images of the numerical entries are displayed one after the other in the order of increasing overall confidence levels.

4. The method of claim 1 wherein said documents are each represented by a pixel array and each includes a predetermined number of fields and the step of locating the predetermined fields on a document comprises the steps of:
   performing a histogram analysis of the pixels in said array in a direction transverse to said predetermined number of fields so as to locate said fields, in sequence, on the document; and
   selecting a field from said located fields at a predetermined position in said sequence.

5. The method of claim 1, wherein said predetermined fields are represented by a pixel array and said segmenting step comprises the steps of:
   locating groups of connected black pixels within a predetermined field; and
   eliminating selected groups of connected black pixels as insignificant according to predetermined criteria, whereby the remaining groups each comprise a distinct segment.

6. The method of claim 5 wherein said character recognition step comprises the step of subjecting each said remaining group to feature analysis, said analysis comprising the step of associating a characteristic feature vector with each said remaining group.

7. The method of claim 6 wherein the step of assigning a character confidence level comprises the steps of:
   providing a dictionary of feature vectors, each feature vector having a known character associated therewith;

defining an assembly of subsets of feature vectors in said dictionary, each said subset having a predetermined confidence level associated therewith; and, associating a subset of said assembly with said characteristic feature vector and thereby associating said predetermined subset confidence level with said characteristic feature vector.

8. Apparatus for use with transaction balancing and reconciliation apparatus for processing transaction documents bearing numerical entries, said documents including a plurality of first document types and a second document type, each said first document type having a predetermined field containing a handwritten numerical entry and said second document type having a predetermined field containing a numerical entry representing the combined value of the numerical entries of said first document types, said apparatus comprising:

memory means for storing images of said documents;

field-locating means receiving said document images for locating said predetermined fields in said images;

character segment generating means responsive to said field-locating means for partitioning located predetermined fields into segments, each said segment containing an individual character of said numerical entry;

recognition means receiving said segments for recognizing the individual characters contained therein;

character confidence level means communicating with said recognition means for assigning a confidence level to each said segment indicating the confidence with which the character contained therein is recognized;

field assembly means for assembling individual recognized characters into recognized numerical lentries, said field assembly means being adapted to communicate said recognized numerical entries to said transaction balancing and reconciliation apparatus;

field confidence level means responsive to said character confidence levels for assigning overall confidence levels to said recognized numerical entries; and image sequencing means responsive to said transaction balancing and reconciliation apparatus for presenting the images of said predetermined fields in order of increasing overall confidence level to a display monitor when the associated transaction fails to balance;

whereby an operator may present the numerical entries from said display monitor to said transaction balancing and reconciliation apparatus one by one in order of increasing overall confidence level until the associated transaction balances.

\* \* \* \* \*